Patented Mar. 22, 1938

2,111,920

UNITED STATES PATENT OFFICE 2,111,920

SLUDGE SEPARATION

Alfred A. Wells, Roselle Park, N. J., assignor to Standard Oil Development Company, a corporation of Delaware No Drawing. Application December 31, 1935, Serial No. 57,014

4 Claims. (Cl. 196—148)

This invention relates to improvements in the art of refining petroleum oils and relates particularly to the treatment of separated acid sludge formed by reacting petroleum oil with concentrated sulfuric acid.

An acid sludge is formed when a petroleum oil is reacted with sulfuric acid of high concentrations. The acid sludge so formed is generally diluted with water and the mixture heated either at atmospheric pressure or at elevated pressure, thereby causing a weak acid and an acid oil to be separated. But on the other hand, it is often necessary in the operation of a refinery to store the acid sludge over a period of time extending from a few hours to several days, due either to breakdown in the acid separating equipment or the production of sludge beyond which the recovery plant can normally take care of. Then the sulfuric acid and the petroleum oil in the acid sludge (where the acid sludge had been formed by reacting concentrated sulfuric acid with the petroleum oil) continue reacting with the result that the petroleum oil is charred or coked and the separation of the sulfuric acid and acid oil is extremely difficult if not impossible. This is especially true when the petroleum oil being treated contains a high percentage of unsaturated hydrocarbon compounds formed by subjecting the petroleum oil to a cracking temperature of 450° F. to 1200° F. or higher, or when a very concentrated sulfuric acid such as acid of 92% concentration to fuming sulfuric acid is used.

An object of this invention is to increase the yields of sulfuric acid and petroleum oil that are recovered from an acid sludge.

Another object of this invention is to control the action of sulfuric acid on petroleum oil.

These and other objects of this invention will be more readily understood on reading the following examples.

Cracked naphtha if treated with sulfuric acid of 98% concentration forms an acid sludge. This acid sludge on being separated, if allowed to stand, continues to react so that the oily constituents are charred or coked by the sulfuric acid, and on dilution with water and heating under pressure a separation of weak acid and acid oil is not readily obtained. The amount of acid oil that may be recovered is small due to the further continued action of sulfuric acid and the acid oil. According to this invention it has been found that if the acid sludge as soon as it is separated from the treated oil, has incorporated into it an amount of water (5 to 15% based upon the quantity of the acid sludge) sufficient to dilute below reactive strength but not enough to cause separation, the sludge may be stored for a considerable period of time without any material deterioration.

In the operation of a refinery where a white lubricating oil, such as medicinal white mineral oil is prepared, a strong acid such as fuming sulfuric acid is used in treating this oil. All of the acid required to refine this oil is not used in one treat but only small fractions of the total acid at one time, i. e. where the oil is to be subjected to a treatment with 50% of sulfuric acid only 5 to 10% are used at one time, the oil being subjected to five or ten separate treats. The acid sludges that are formed are separated from the oil after each treat.

The acid sludges that are formed in the first of these various treating steps are very viscous, and as the various treats are performed the separated acid sludges obtained after each treat decrease in viscosity so that finally the acid sludges obtained after the last few treats are of low viscosity or "thin" acid sludges. These "thin" acid sludges are used in treating other oils which do not require drastic treatments or which are first treated with "thin" acid sludges and then with concentrated sulfuric acid. With the approach of summer and warmer atmospheric temperatures, it was found that the "thin" acid sludge deteriorated and separated out a thick viscous material which could not be pumped.

According to this invention a "thin" acid sludge was divided into three fractions. One fraction was diluted by adding 5% of water based upon the quantity of the "thin" acid sludge, another fraction was diluted by adding 10% of water, and a third fraction was undiluted, so that it could be used for comparison. At the end of a week's standing of these three fractions, the undiluted "thin" acid sludge had separated out a large amount of highly viscous material, while that fraction diluted with 5% of water remained perfectly fluid without depositing any substantial amount of viscous material. The sample containing 10% of added water, however, again deposited viscous material. It is seen, therefore, that the amount of water required to control the reaction of oil and sulfuric acid in a separated acid sludge is about 5%. The amount of water required is dependent on the oil treated and the concentration of sulfuric acid used as with some acid sludges amounts up to about 15% of water can be added without any separation of the acid from the oil and with a control of the acid-oil reaction obtained.

It is well known that small quantities of water are added during the acid treatment of mineral oil to assist in coagulating the sludge and aid in rapid settling. However, the quantity of water so used is of necessity too small to accomplish the purpose of this invention. If larger quantities of water were to be added, some of the coloring matter would be dissolved from the sludge by the oil, thus partially offsetting the effect of the acid treat.

The foregoing description is merely illustrative and other acids and acid diluents may be used within the scope of the appended claims in which it is my intention to claim all novelty as broadly as the prior art permits.

I claim:

1. In a process of refining petroleum oil, the steps which comprise separating an acid sludge which is to be stored for a period of time and has been produced by treating a petroleum oil with a concentrated sulfuric acid and diluting the said acid sludge with 5 to 15% of water to stabilize the sludge against further chemical reaction but not sufficient to cause a separation between oily and acid components of the acid sludge during storage.

2. In a process of refining petroleum oil, the steps which comprise separating an acid sludge which is to be stored for a period of time and has been produced by treating a petroleum oil with a fuming sulfuric acid and diluting the said acid sludge with 5 to 15% of water to stabilize the sludge against further chemical reaction but not sufficient to cause a separation between oily and acid components of the acid sludge during storage.

3. In a process of treating a naphtha, the steps which comprise separating the acid sludge which is to be stored for a period of time and has been produced by treating a naphtha with a concentrated sulfuric acid and diluting the said acid sludge with 5 to 15% of water to stabilize the sludge against further chemical reaction but not sufficient to cause a separation between oily and acid components of the acid sludge during storage.

4. In a process of treating a mineral lubricating oil, the steps which comprise separating an acid sludge which is to be stored for a period of time and has been produced by treating a mineral lubricating oil with a concentrated sulfuric acid and diluting the said acid sludge with 5 to 15% of water to stabilize the sludge against further chemical reaction but not sufficient to cause a separation between oily and acid components of the acid sludge during storage.

ALFRED A. WELLS.